United States Patent [19]

Müller

[11] Patent Number: 4,995,779

[45] Date of Patent: Feb. 26, 1991

[54] METHOD AND DEVICE FOR ALIGNING AND STORING IN A GIVEN ORDER MOLDINGS HAVING A TUBULAR PERFORATION

[75] Inventor: Torsten Müller, Hannover, Fed. Rep. of Germany

[73] Assignee: U.S. Philips Corporation, New York, N.Y.

[21] Appl. No.: 302,164

[22] Filed: Jan. 25, 1989

[30] Foreign Application Priority Data

Feb. 9, 1988 [DE] Fed. Rep. of Germany ....... 3803811

[51] Int. Cl.$^5$ .......................................... B65G 47/248
[52] U.S. Cl. ...................................... 414/27; 198/380; 198/388; 414/755; 414/773; 414/776; 414/786
[58] Field of Search ........................ 198/376, 380, 388; 414/27, 755, 758, 786, 773, 776, 778

[56] References Cited

U.S. PATENT DOCUMENTS

| 3,260,347 | 7/1966 | Barnes | 198/388 X |
| 3,710,920 | 1/1973 | Sterling | 198/380 |
| 3,791,553 | 2/1974 | Aidlin et al. | 198/388 X |
| 4,201,504 | 5/1980 | Arnold et al. | 414/27 |

FOREIGN PATENT DOCUMENTS 243720 10/1986 Japan .................................. 414/758

Primary Examiner—Robert J. Spar
Assistant Examiner—Janice Krizek
Attorney, Agent, or Firm—Bernard Tiegerman

[57] ABSTRACT

"Method and device for aligning and storing in a given order moldings having a tubular perforation." Individual moldings (6) are introduced successively from above into a turbulence space above a receiving mandrel (5) profiled for reception in the perforation (7) in the molding (6). Each molding is subjected to an aligning air turbulence until the molding (6) has been aligned with its perforation (7) with respect to the receiving mandrel (5) in such a manner that the molding (6) falls onto the receiving mandrel (5) due to an air resistance decreasing as a result of the alignment. The receiving mandrel (5) then passes the molding (6) on to a deposition transport rail (19).

14 Claims, 2 Drawing Sheets

METHOD AND DEVICE FOR ALIGNING AND STORING IN A GIVEN ORDER MOLDINGS HAVING A TUBULAR PERFORATION

BACKGROUND OF THE INVENTION

The invention relates to a method and a device for aligning and storing moldings having a tubular perforation, particularly coil formers, in a given order.

Coil formers for transformers are usually supplied by a molding machine, in which they have been molded, without any order. For further processing, for example for driving-in connection pins or winding with wire coils, they must be aligned beforehand in a given order. This alignment generally takes place by means of so-called vibration feeders. These vibration feeders consist of voluminous funnel-shaped pots, at whose wall a transport track which extends helically downwards and on which mechanical baffles are arranged is provided. These mechanical baffles are adjusted so that all the moldings which are not located in the correct direction on the transport track are thrown out or—as far as this is possible—are brought by these very baffles into the desired position, or, more accurately defined, into the desired orientation.

For each given type of a molding or component, a specific vibration feeder is generally required. Therefore, for each molding an individual vibration feeder or at least a pot support must be kept in stock, which according to need is placed on an alignment device before a handling station. Large moldings also result in large vibration feeder pots. Therefore, a very large amount of storage space is required to keep in stock the individual vibration feeder pots.

SUMMARY OF THE INVENTION

The invention has the object of providing a method and a device for alignment of moldings and storing them after alignment, in which a high operating speed is attained, in which only a few parts have to be exchanged for the change from one molding to another and in which the device parts to be exchanged require a small amount of storage space.

Individual moldings are successively introduced from above into a turbulence space above a receiving mandrel profiled for reception in the perforation in the molding. Each molding is subjected to an aligning air turbulence until the molding has been aligned with its perforation with respect to the receiving mandrel in such a manner that the molding falls onto the receiving mandrel due to an air resistance decreasing as a result of the alignment. The receiving mandrel then passes the molding on to at least one deposition transport rail. The air turbulence in the turbulence chamber is capable of revolving the molding and of rotating it (rotation about the three body axes). Because of its own weight and the lifting forces of the air turbulence acting on the molding, it revolves until its perforation is arranged in line with the receiving mandrel. At this instant, its movement abruptly comes to rest, because part of the air flows through the perforation. The drive-up forces disappear and the molding falls onto the receiving mandrel, which then passes it on to a transport rail. The alignment operation in the air current is effected rapidly. The diameter of the turbulence chamber need be only slightly larger than the largest dimension of the molding.

According to a further embodiment of the invention, it is ensured that the air turbulence is formed from several air currents which are differently aligned. By means of several air currents whose blowing strength is controlled, the turbulence can be continuously adapted to the desired requirements.

According to a further embodiment of the invention, it is ensured that the position of the molding on the receiving mandrel controlled by means of sensors for presence and orientation control.

According to a further embodiment of the invention, it is ensured that a first air current blows from the receiving mandrel perpendicularly upwards and a second air current blows approximately transversely thereto and that both currents together act upon the molding. With a suitable proportioning of the air current, the molding is kept floating by means of the air current emanating perpendicularly upwards from the receiving mandrel with constant discharge, while the second air current is a pulsatory air current, which sets the molding into rotation above the receiving mandrel. The molding is lowered onto the receiving mandrel only when it has reached an orientation in which the perforation in the molding offers a reduced flow resistance to the air current.

A device for carrying out the method according to the invention is characterized by a receiving mandrel, which is arranged in the lower part of a vertical enclosure, which is aligned vertically upwards and whose cross-section corresponds to the cross-section of the perforation in a molding to be placed on it after alignment;

air discharge nozzles, which produce above the receiving mandrel in the enclosure an air turbulence, in which the molding is movable in a freely floating and revolving manner;

sensors, which locate the position of the molding after its deposition on the receiving mandrel;

a movement device for the receiving mandrel to pass moldings, which are placed on it after alignment, on to the deposition transport rail.

The whole alignment device therefore consists only of the vertically arranged enclosure, in which an air turbulence is produced, and of a receiving mandrel on the lower side of the enclosure, onto which a molding aligned in the air turbulence can fall. The movement device of the receiving mandrel permits of tilting it laterally or of rotating it about its vertical axis. Thus, if the ends of the moldings include flanges, it becomes possible to align the various end flanges to achieve a desired position of the end flanges and to pass moldings on to deposition transport rails.

According to a further embodiment of the invention, it is ensured that the enclosure has a circular cross-section. Due to a circular cross-section, a regular turbulence is obtained and an unhindered rotation of the molding is allowed.

According to a further embodiment of the invention, it is ensured that the receiving mandrel can be tilted about a horizontal axis. Due to the tilting movement about the horizontal axis, the moldings are passed directly or in a position turned upside down on to the deposition transport rail.

According to a further embodiment of the invention, it is ensured that the receiving mandrel can rotate about a vertical axis. Due to the rotary movement about the vertical axis, the front side and the back side can also be exchanged before the deposition on the transport rail.

According to a further embodiment of the invention, it is ensured that the enclosure is open on the upper side for collecting moldings thrown into it. In order to make the alignment device operative, it is therefore only necessary to throw the moldings separately into the enclosure. The alignment need therefore be preceded only by a separation of any kind.

DETAILED DESCRIPTION OF THE PREFERRED EMBODIMENTS

Figure 1:
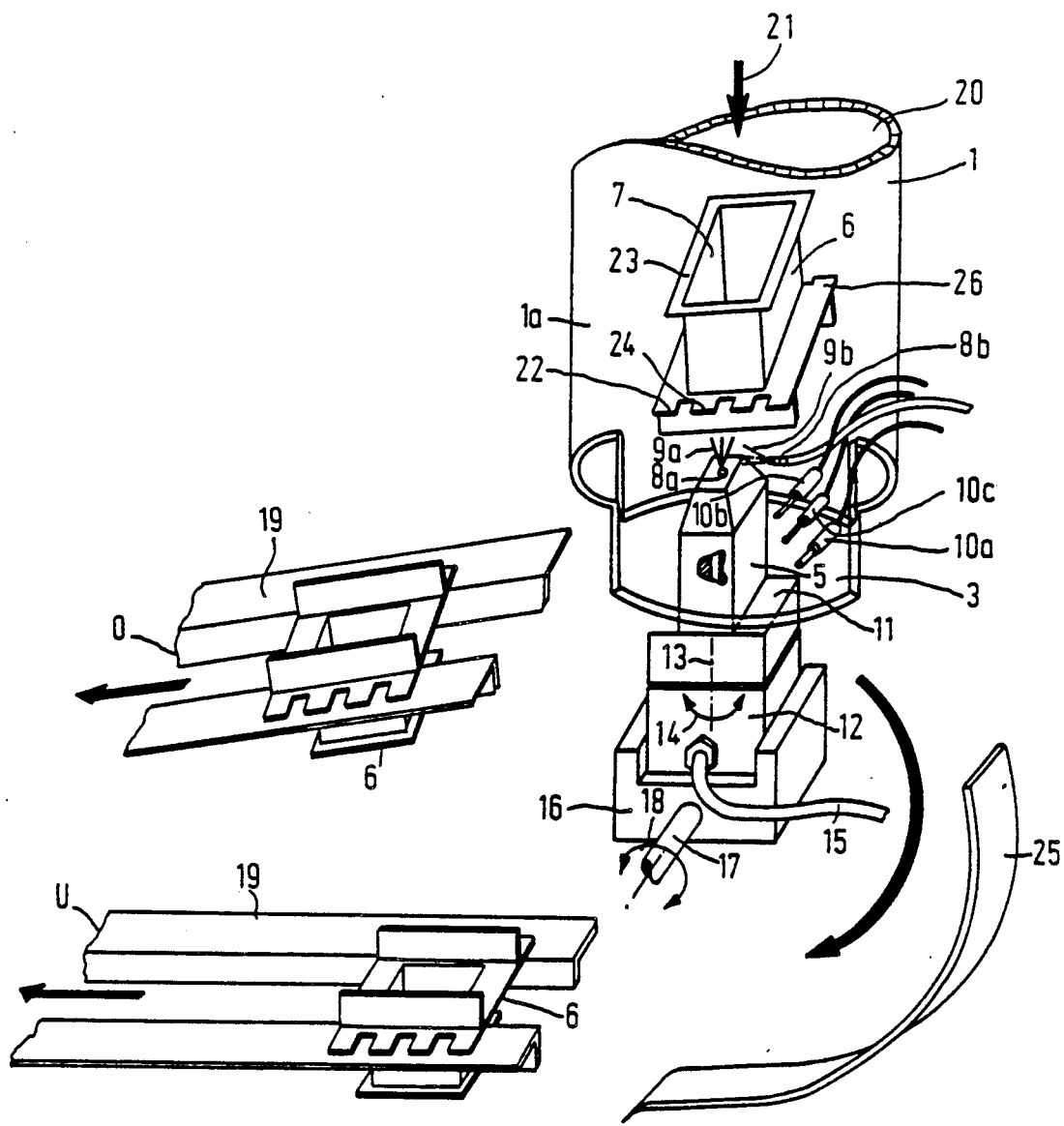
FIG. 1 shows a device for aligning and storing in a given order moldings having a tubular perforation.

The drawing shows a device for aligning and storing in a given order moldings having a tubular perforation, more particularly coil formers for transformers. The device and the alignment method are likewise suitable, however, for moldings of any kind, which must be supplied from a storage without any order to a working station in a given order. The device consists of an enclosure 1 of cylindrical shape, which is vertically arranged. The enclosure may consist, for example, of a transparent synthetic material. The enclosure encloses a turbulence space 1a. Preferably, several enclosures of different diameters are kept in stock, each enclosure being suitable for a given group of dimension proportions of the moldings.

From the lower side 3, a centering and receiving mandrel 5 engages into the enclosure 1. This centering and receiving mandrel 5 has along the horizontal a cross-section which is such an approximation of the cross-section of a molding which is to be aligned in the enclosure 1 that the molding 6 can fall with its perforation 7 onto the receiving mandrel 5.

At least two air nozzles are provided, i.e. a first air nozzle 8a from which compressed air flows upwards in vertical direction. The discharge axis of the nozzle 8a and the axis of the enclosure 1 will then preferably coincide. The first air nozzle 8a is located in the receiving mandrel 5.

A second air nozzle 8b is arranged outside the receiving mandrel 5. The air current 9b leaving the second air nozzle 8b leaves the nozzle 8b either perpendicularly or at an angle to the air current 9a leaving the air nozzle 8a. The air current 9a forms above the receiving mandrel 5 a kind of air cushion and the air current 9b from the nozzle 8b causes a turbulence of this air cushion. Thus, in the turbulence chamber 1a an air turbulence is produced, in which the molding 6 can be aligned. The air current 9a leaves the air nozzle 8a in a constant flow. The air current 9b leaves the air nozzle 8b on the contrary in pulsating form. This pulsation reduces the time of alignment of the molding 6 above the receiving mandrel 5.

The air currents 9a and 9b are adjusted by choke valves not shown. The adjustment of the choke valves can be effected in a programmable manner by stepping motors.

At least three electrically operating sensors 10a, 10b and 10c are provided, which control the position of the molding on the receiving mandrel 5. The sensors 10a, 10b and 10c may be infrared sensors. The sensors 10a, 10b and 10c are shown in the drawing being separated from the receiving mandrel. However, without further explanation they may also be arranged at the foot 11 of the receiving mandrel 5; in fact they preferably serve to locate the position of the molding on the receiving mandrel. This position location determines how the molding is stored by the receiving mandrel.

The foot 11 of the receiving mandrel 5 is rotatable on support 12 about an axis 13. The rotatability is indicated by a double arrow 14. The air for the air nozzle 8a may be introduced, for example, by means of a supply lead 15 into the support 12.

The support 12 is inserted into a container 16, which can be tilted about an axis 17, which extends substantially perpendicularly with respect to the axis 13. A double arrow 18 indicates the tiltability of the container 16.

A deposition transport rail 19 is provided, which can be pivoted in a manner not shown between an upper position O and a lower position U.

The alignment of the molding 6 in the device is effected in the following manner. The molding 6 is thrown in a manner not shown into the enclosure 1 open on its upper side 20 in the direction of an arrow 21. The air current 9a forms above the receiving mandrel 5 a cushion and the air current 9b produces an air turbulence in the air cushion in a pulsating manner. If the molding 6 now falls into this air turbulence, it is revolved until the perforation 7 has been aligned with respect to the receiving mandrel 5. Both the receiving mandrel 5 and the perforation 7 in this embodiment have a rectangular cross-section. As soon as the perforation 7 has been aligned with respect to the receiving mandrel 5, the air current 9a blows with a greater strength through the perforation 7. As a result, the air resistance under the molding 6 is reduced (the air cushion is weakened) and it falls onto the receiving mandrel 5. The sensors 10a, 10b and 10c note this fall onto the receiving mandrel 5 and at the same time indicate its orientation to the receiving mandrel 5. The molding 6 can in fact fall in different ways onto the receiving mandrel 5 if it has, like in this embodiment, two differently shaped flanges 22, 23. The flange 23 is short and has a uniform height, while the flange 22 has on one side abutment points 24 for connection wires. If the molding 6 falls onto the receiving mandrel in the manner shown in the drawing, the abutment points 24 are located at the front bottom part. This means that the molding, whose abutment points in this embodiment should lie above, must be turned upside down. The receiving mandrel 5 is therefore pivoted with the shaft 17 in clockwise direction and a guide lamination 25 turns the molding 6 upside down so that it slides in the correct position onto the part of the deposition transport rail 19 indicated below by U. If the larger flange 22 should have been located with the abutment points 24 at the front top part when falling onto the receiving mandrel 5, the mandrel 5 would have been tilted about the shaft 17 in counterclockwise direction. The molding 6 would then have moved again in the correct manner, but now up against the guide rail part 0 shown above. If now a distinction should be made between abutment points 24 and further abutment points 26, this can be taken into account by rotatIon of the receiving mandrel 5 about the axis 13. The sensors 10a, 10b and 10c give for all these displacement steps of the receiving mandrel 5 the correct and necessary commands.

For each molding, a different receiving mandrel is required. Therefore, a different receiving mandrel 5 with foot 11 is kept ready for exchange for each molding. The parts to be exchanged are small and can readily be exchanged.

Figure 2:
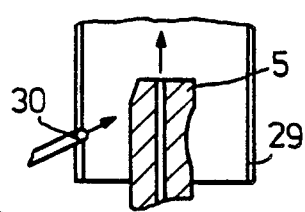
FIGS. 2 to 7 show centering and receiving mandrels, respectively, of the device shown in FIG. 1 in different shapes, partly in a cup-shaped enclosure with an air nozzle introduced into it.
Figure 4:
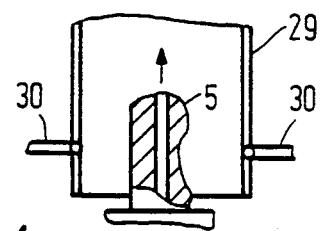
Figure 3:
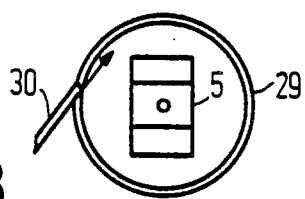
Figure 5:
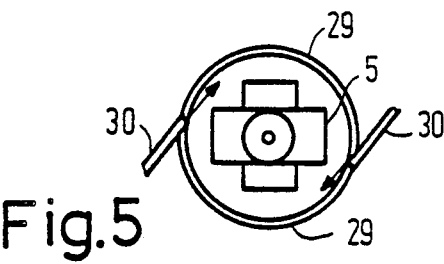
Figure 6:
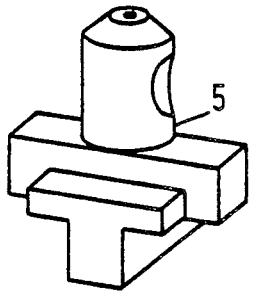
Figure 7:
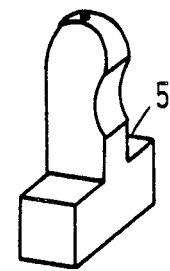

FIGS. 2 to 7 show different shaps of orientations and receiving mandrels 5 in a cup-shaped enclosure 29, into which air can be introduced by an air nozzle 30. The shape of the mandrels 5 can then produce air turbulences around the mandrels 5, which facilitate the orientation of the molding and assist in accelerating it.

I claim:

1. A method of aligning and storing in a given order moldings each having a tubular perforation, comprising the steps of:
   providing a receiving mandrel profiled for reception in the tubular perforation,
   providing an air turbulence space above the mandrel,
   successively introducing the individual moldings into the turbulence space above the receiving mandrel,
   subjecting each molding to an aligning air turbulence until the perforation is aligned with the mandrel, said turbulence being such that the molding then falls onto the receiving mandrel due to a decrease in air resistance resulting from the alignment,
   passing each molding onto a deposition transport rail after reception on the mandrel.

2. A method as claimed in claim 1, characterized in that said air turbulence is formed by interacting at least first and second differently aligned air currents (9a, 9b).

3. A method as claimed in claim 1, characterized in that said method further comprises the step of controlling the position of each molding (6) on the receiving mandrel using sensors for presence and orientation control.

4. A method as claimed in claim 2, characterized in that said first air current (9a) is aligned transversely to said second air current (9b).

5. A method as claimed in claim 4, characterized in that the air flow associated with said first air current (9a) is substantially constant.

6. A method as claimed in claim 4, characterized in that the air flow associated with said second air current (9b) is pulsatory.

7. A device for aligning and storing in a given order moldings having a tubular perforation, comprising
   a receiving mandrel (5), arranged in the lower part (3) of a vertical enclosure (1), which is aligned vertically upwards and whose cross-section corresponds to the cross-section of the perforation (7) in a molding (6) to be placed on it after alignment;
   air discharge nozzles (8a, 8b), which produce above the receiving mandrel (5) in the enclosure (1) an air turbulence, in which the molding (6) is movable in a freely floating and revolving manner;
   sensors (10a, 10b, 10c), which locate the position of the molding (6) after its deposition on the receiving mandrel;
   a movement device (11 to 18) for the receiving mandrel (5) to pass moldings (6), which are placed on the receiving mandrel after alignment, on to a deposition transport rail (19).

8. A device as claimed in claim 7, characterized in that the enclosure (1) has a circular cross-section.

9. A device as claimed in claim 7, characterized in that the receiving mandrel (5) can be tilted about a horizontal axis (17).

10. A device as claimed in claim 7, characterized in that the receiving mandrel (5) can be rotated about a vertical axis (13).

11. A device as claimed in claim 8, characterized in that the enclosure (1) is open on the upper side for collecting moldings (6) thrown into it.

12. A device as claimed in claim 7, characterized in that a first air nozzle (8a) directed vertically upwards for a vertical air current (9a) is provided.

13. A device as claimed in claim 7, characterized in that a first air nozzle (8a) is provided in the receiving mandrel (5).

14. A device as claimed in claim 13, characterized in that a second air nozzle (8b) is aligned transversely or at an angle to the first air nozzle (8a) and emits a turbulence current (9b).

* * * * *